Figure 1:
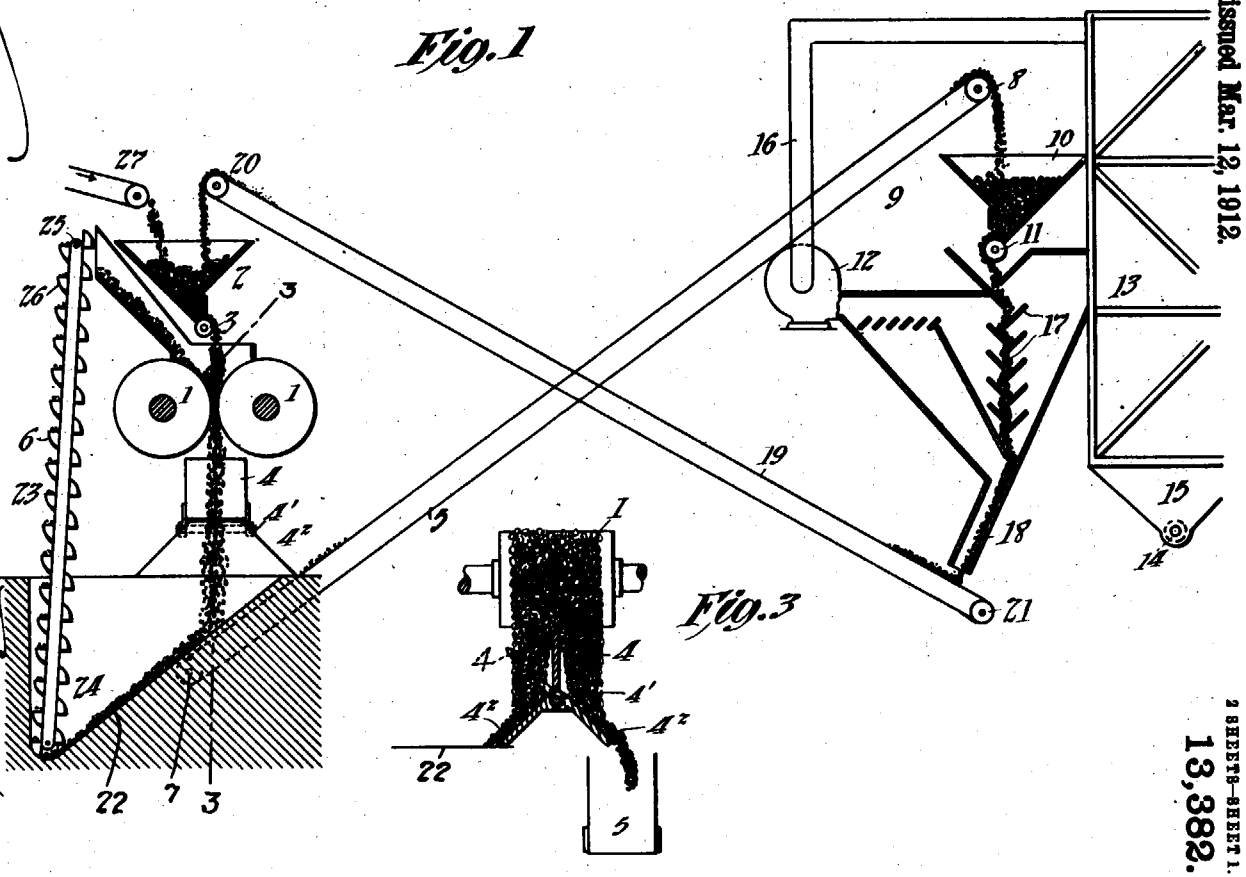

T. A. EDISON.

CRUSHING AND SEPARATING FINE MATERIALS.

APPLICATION FILED FEB. 3, 1912.

Reissued Mar. 12, 1912.

2 SHEETS—SHEET 1.

13,382.

Witnesses:
Frank D. Lewis
Dyer Smith

Inventor:
Thomas A. Edison
by Frank L. Dyer
Atty.

T. A. EDISON.

CRUSHING AND SEPARATING FINE MATERIALS.

APPLICATION FILED FEB. 3, 1912.

Reissued Mar. 12, 1912.

2 SHEETS—SHEET 2.

13,382.

Witnesses:
Frank D. Lewis
Dyer Smith

Inventor:
Thomas A. Edison
by Frank L. Dyer
Atty.

UNITED STATES PATENT OFFICE.

THOMAS A. EDISON, OF LLEWELLYN PARK, WEST ORANGE, NEW JERSEY.

CRUSHING AND SEPARATING FINE MATERIALS.

13,382. Specification of Reissued Letters Patent. Reissued Mar. 12, 1912.

Original No. 1,002,504, dated September 5, 1911, Serial No. 476,488. Application for reissue filed February 3, 1912. Serial No. 675,973.

*To all whom it may concern:*

Be it known that I, THOMAS A. EDISON, a citizen of the United States, and a resident of Llewellyn Park, West Orange, county of Essex, and State of New Jersey, have made a certain new and useful Improvement in Crushing and Separating Fine Materials, of which the following is a description.

My invention relates to an improved method for separating and grinding fine materials and to an improved apparatus for carrying said process into effect.

The object of this invention is to increase the capacity of that class of appliances connected with crushing machinery which comprises a crushing system and a blowing or other separating system, whereby the fine material sought, such as Portland cement, can be removed from the body of the ore, and the coarse ore returned to the crusher to be reground.

In Letters Patent No. 841,677, issued to me on January 22, 1907, for apparatus for grinding and separating fine materials, a system is described in which the product from a plurality of rolls passes to one common belt conveyer system, whence it passes down through a number of blowers connected with dust chambers for settling the dust blown out, the tailings of the separator, that is, the material from which the fine dust has been so separated, falling upon one common conveyer system to be returned to the several crushing rolls for regrinding. Where the material to be handled is very hard, the percentage of fines, that is, of material sufficiently fine to be utilized as desired, is small for the amount of material handled, and it is very desirable to relieve the conveyer system of so large a non-effective bulk, and to increase the capacity of the blowers or other means which may be employed for separating out fine material. I attain this result in a very simple manner by connecting to each roll an elevator and an adjustable deflecting plate beneath the roll, whereby any desired portion of the ore, after passing through the rolls, and which would in the system shown in my patent above referred to, go directly to the blowers, is deflected to the elevator and returned to the rolls locally and recrushed, thus enriching the ore which is conveyed to the blowers.

In order that my invention may be better understood, attention is directed to the accompanying drawings, forming part of this specification, in which the same reference characters are used throughout the various figures to denote corresponding parts.

Figure 2:
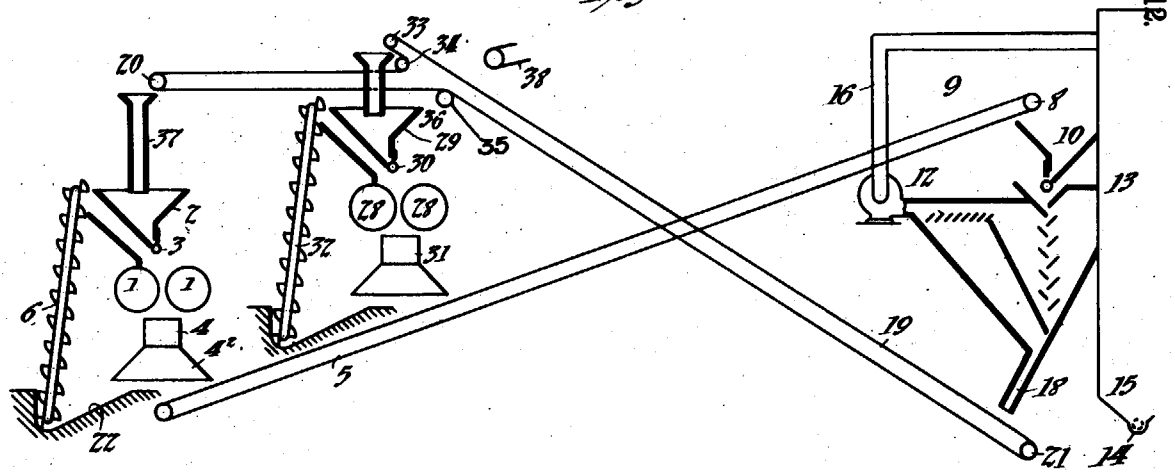

In the drawings, Figure 1 represents a diagrammatic view of the system embodying my invention, in which a single pair of rolls only is shown, Fig. 2 is a diagrammatic view showing the manner of carrying out the same method with a plurality of crushing rolls used in connection with a common conveyer system, and Fig. 3 is a sectional view taken on line 3—3 in Fig. 1, showing the deflecting plate below a pair of rolls.

Referring to Fig. 1 of the drawings, the crushing rolls 1 are provided with ore or other material to be crushed from the hopper 2, which is provided with a roller feed 3 for feeding the material to the rolls in a wide, thin stream. The material crushed falls from the rolls in a stream, which may be intercepted by an adjustable deflecting gate or plate, which is indicated diagrammatically at 4. The deflecting plate 4 is shown in full lines as intercepting the stream of falling crushed material midway to divide it evenly in two parts. The plate is shown as pivoted at 4′ and may be tilted transversely to the drection of rotation of the rolls to such a position as to divide the stream of material in some other proportion, such a position being shown in dotted lines. Stationary guide plates $4^2$ are shown below the pivot 4′ to guide the streams of ore divided by the plate 4 to the conveyer 5 and the inclined surface 22. The material so divided passes, part to the endless, continuously operating conveyer belt 5 leading to the blowers, and part to the continuously operating elevator 6, which returns the same to the feed for the rolls. The gate 4 may be adjusted to effect any desired ratio of division of the crushed material.

As indicated, the conveyer 5, which rotates over wheels 7 and 8 at either end thereof, carries the ore to a separator 9. While any suitable form of separator may be used, I prefer to employ a blower system, as shown, wherein the material falling from the conveyer 5 into a hopper 10 is fed by a roller feed 11 into the path of a current of air blown by a fan or blower 12. The air blown by blower 12 and carrying with it the fine dust-like particles contained in the falling stream of ore, passes into a series of settling chambers 13 in which the dust settles and from which it may be removed by means of a conveyer 14 passing through the hopper 15 in the bottom of the chamber. The supply of air for blower 12 is drawn through a tube or passageway 16 from the dust chamber itself, so that a closed circulating system is thereby provided in which the ill effects of changes in the condition of the outside atmospheric air are prevented. The stream of ore falling from the roller feed 11 in the path of air proceeding from the blower 12, is intercepted and delayed in order that the air currents may properly separate the fine particles therefrom by means of baffle plates 17, as shown. The tailings from the separator pass through a spout 18 on to a continuously operating conveyer 19 carried by rollers 20 and 21, which return the said tailings to the hopper 2 to be again passed through the rolls 1. The portion of the ore passing through the rolls 1, which is deflected by the gate 4 into the local system, passes down the inclined surface 22 from the bottom of which it is removed, as stated, by the continuously operating elevator 6, and fed into the feed for the rolls as above stated. The elevator 6 is shown as consisting of an endless belt 23 passing over rolls 24 and 25 and provided with buckets 26, although any other form of conveyer by which the ore deflected might be continuously conveyed to the hopper of the crushing rolls, might be employed as well as the form indicated. The ore removed from the circulating system described, each cycle of the same in the form of dust separated therefrom by the blower 12, is replaced by crude ore from the stock house. This may be added to the system at any convenient point, and as indicated in the drawings, it is fed directly into the hopper 2 by means of the conveyer 27, which is understood to lead from the stock house or other source of crude ore.

In Fig. 2 of the drawings the same system is represented with the addition of a second pair of crushing rolls to indicate the manner of proceeding when a plurality of such rolls are used in the system. Here, as in the case of Fig. 1, the ore fed to rolls 1 by roller feed 3 is separated by deflecting gate 4 into two divisions, one of which is carried by conveyer 5 to separator 9, and the other of which is guided by inclined surface 22 to elevator 6 to be conveyed back again to the feed for the rolls 1.

Ore for the rolls 28 is fed from hopper 29 by means of roller feed 30 and is deflected in a similar manner to that described in connection with the first named pair of rolls by means of deflecting gate 31 into two divisions, one of which falls upon the conveyer 5 and the other of which is elevated by the elevator 32 to be added to the feed for the rolls 28. The tailings of the separator 9 fall from spout 18 upon conveyer 19, whence they are conveyed back to the feeds of the several crushing rolls as indicated in the figure. The conveyer 19 passes over the rolls 20 and 21 at the ends thereof as in the case of Fig. 1, but it also is guided by rolls 33, 34 and 35, so that a portion of the ore carried thereby may be fed into hopper 29 for rolls 28, while the remainder of the ore is carried to hopper 2 for the rolls 1. This is arranged by having the conveyer provided with rolls 33 and 34 so positioned as to conduct the conveyer 19 past the hopper 29 with an upper and a lower run, whereby the conveyer in passing over roller 33 unloads ore through chute 36 into hopper 29 to an extent equal to the capacity of the rolls 28, while the remainder of the ore carried by the conveyer 19 is caught by the lower run of the conveyer and carried onward to chute 37 of hopper 2. Crude ore from the stock house may be added to the system at any convenient point as by the conveyer 38 indicated diametrically in the figure.

As an example of the use of my invention, if it be supposed that 300 tons of ore pass through a pair of rolls per hour with 10% of fine material of the required size therein, 300 tons would have to be handled by the conveying system and blowers per hour to obtain 30 tons of fine material in a system of the type indicated by my Letters Patent above referred to, and before the addition of the invention described herein. If, however, say 150 tons of the 300 tons crushed per hour by the crushing rolls in this illustration be removed by the deflecting gate, passed to the elevator and thence again crushed by the rolls, the latter would still be crushing 300 tons of ore per hour and the blower or separator would be separating nearly 30 tons of fine material per hour as may be demonstrated mathematically, but the conveying system and the blowers would be carrying only 150 tons per hour.

It should be noted that when the deflecting gate is set in its middle position, a given amount of uncrushed material is fed into the rolls in a given short time interval from the belt 19 and from the stock house, and an equal amount of material partly crushed or fine and partly uncrushed is fed into the rolls from the continuously operating elevator system. A given percentage of the uncrushed portion of the material is crushed in passing through the rolls, and all the material is divided in half, one part going off on belt 5 to the blower, and the other part being returned to the rolls by elevator 6. Each portion must average the same percentage of fine material. The portion of material, crushed or fine and uncrushed or coarse, returned locally to the rolls, meets in the hopper an equal amount of material, all coarse, from belt 19 and the stock house, and the operation of crushing and dividing is repeated, the same given percentage as before of the uncrushed part of the material being reduced to fineness in the passage of the whole through the rolls. It will be seen that in continuous operation the percentage of fines in the material returned locally to the rolls increases rapidly at the start and approaches a maximum, which in the example given seems to be approximately 27.3 or not far from 30 tons of fines per hour, an equal amount of fines, of course, being carried off by the belt 5 to be blown. Therefore, if the capacity of the conveyer system was 300 tons per hour, two sets of crushing rolls could be used therewith in place of the one set previously used, in which case 300 tons of material would go over the conveying system per hour with approximately 55 tons of fine material removed per hour by the blowers. In the device illustrated in Fig. 2, for example, if we conceive the capacity of the conveyer 5 to be 300 tons per hour and the capacity of the sets of rolls 1 and 28 to be 300 tons per hour each, and the gates 4 and 31 to be so adjusted as to divide the stream of ore falling from the rolls 1 and 28 into equal parts, 150 tons per hour would then be deflected by the gates to the conveyer 5 from each set of rolls, and 150 tons per hour would be deflected from each set of rolls to the elevators 6 and 32. With the blower separating then approximately 55 tons of fine material per hour and the conveyer 38 from the stock house making up the deficiency thus occasioned, the conveyers 5 and 19 would be operated up to their capacity of 300 tons per hour and 150 tons of ore per hour would be fed into each of the hoppers 2 and 29 from the conveyer 19 and 150 tons per hour into each of the said hoppers from the elevators 6 and 32, whereby each set of rolls would be supplied with sufficient material to operate at its capacity of 300 tons per hour.

Having now described my invention, what I claim and desire to secure by Letters Patent of the United States is as follows:

1. In separating and crushing apparatus, in combination, crushing means, feeding means for the same, means for dividing the crushed material indiscriminately into two divisions bearing a definite ratio to each other, separating means, means for conveying one division of the crushed material to the separating means, means for conveying the tailings from the separating means back to the feed for the crushing means, and means for conveying the other division of the crushed material back to the feed for the crushing means, substantially as described.

2. In separating and crushing apparatus, in combination, crushing means, feeding means for the same, means for dividing the crushed material as it leaves the crushing means indiscriminately into two divisions bearing a definite ratio to each other, means for returning one division of the crushed material immediately to the feed for the crushing means, and means for conveying the other division of the crushed material to a separator, and said separator, substantially as described.

3. In separating and crushing apparatus, in combination, crushing means, feeding means for the same, adjustable means for dividing the crushed material as it leaves the crushing means indiscriminately into two divisions bearing a definite ratio to each other, and means for returning one division of the crushed material immediately to the feed for the crushing means, substantially as described.

4. In separating and crushing apparatus, in combination, crushing rolls, a hopper for the same, means for separating the crushed material indiscriminately into two parts, a continuously operating elevator for conveying one of said parts back to the hopper, and continuously operating means for conveying the other part to a separator, said separator, and means for returning the tailings of said separator to said hopper, substantially as described.

5. In separating and crushing apparatus, in combination, crushing rolls, a hopper for the same, adjustable means adjustable transversely to the direction of rotation of the rolls for separating the crushed material indiscriminately into two parts, a continuously operating elevator for conveying one of said parts back to the hopper, and continuously operating means for conveying the other part to a separator, said separator, and means for returning the tailings of said separator to said hopper, substantially as described.

6. In separating and crushing apparatus, in combination, crushing rolls, a hopper for the same, means for separating the crushed material indiscriminately into two parts, a continuously operating elevator for conveying one of said parts back to the hopper, and continuously operating means for conveying the other part to a separator, said separator including means for separately recovering the finer particles, means for conveying away said finer particles, and means for returning the tailings of said separator to said hopper, substantially as described.

7. In separating and crushing apparatus, in combination, crushing rolls, a hopper for the same, means for separating the crushed material indiscriminately into two parts, a continuously operating elevator for conveying one of said parts back to the hopper, a separator and continuously operating means for conveying the other part to said separator, said separator including a blower for separating the finer particles from the residue, and dust chambers for settling the particles so separated, and means for returning the residue from said separator to said hopper, substantially as described.

8. In separating and crushing apparatus, in combination, a plurality of crushing means, feeding means for the same, means for dividing the crushed material indiscriminately as it leaves the various crushing means, means for returning one division of the material crushed by each crushing means immediately to the feed for the said crushing means, means for conveying the other divisions of the crushed material to a separator, said separator, and means for returning the tailings of said separator to the various feeding means, substantially as described.

9. The process of crushing and separating fine material, consisting in continuously performing the following operations: crushing material, dividing the crushed material into two parts, returning one of said parts for recrushing, separating fine particles from the other part, returning the residue for recrushing and adding uncrushed material in sufficient amount to replace the fine particles removed, substantially as described.

10. The process for crushing and separating fine material, consisting in continuously performing the following operations: crushing material, dividing the crushed material indiscriminately into two parts bearing a certain ratio, returning one of said parts for recrushing, separating fine particles from the other part, returning the residue for recrushing and adding uncrushed material in sufficient amount to replace the fine particles removed, substantially as described.

This specification signed and witnessed this 27 day of Jan. 1909.

THOS. A. EDISON.

Witnesses:
FRANK L. DYER,
DYER SMITH.